Inventor
GEORGE EDWARD FROST
By Ralph L Chappel
Attorney

GEORGE EDWARD FROST

Patented July 22, 1947

2,424,231

UNITED STATES PATENT OFFICE 2,424,231

SYSTEM FOR REDUCING DIRECT-CURRENT FAULT CURRENTS

George E. Frost, Arlington, Va.

Application June 23, 1945, Serial No. 601,277

2 Claims. (Cl. 172—239)

(Granted under the act of March 3, 1883, as amended April 30, 1928; 370 O. G. 757)

My invention relates to the protection of electrical systems from the destructive effects of sudden heavy overloads or short circuits. The possibility of sudden short circuit is a critical factor in the design of electric systems. Such short circuits, creating a low resistance current path across generators and motors connected to the system, tend to cause large, highly destructive, currents to flow in the machines and system. In direct current systems these currents are particularly dangerous to men and machinery by reason of their rapid rise to exceedingly high values and the inherent susceptibility of direct current machinery to commutator flashover. In the interest of reducing the destructive effects of these currents, it is standard practice to supply fast, high-capacity, circuit breakers capable of rapidly interrupting these high fault currents and to design machinery and distribution equipment with sufficient margin of safety to enable it to withstand the mechanical, electrical, and thermal strains associated with the initial high current flow preceding circuit breaker operation. Both of these steps are expensive, the former requiring very large and bulky circuit breakers and the latter demanding excessive generator, cable, switchboard, and motor size.

The conventional method of using circuit breakers and large machines to handle direct current short circuits is subject to an additional disadvantage; namely, loss of selective circuit-breaker operation. Distribution system or rotating machine faults usually represent only a localized condition of failure not immediately involving other parts of the system. Maximum reliability of the system as a whole can be obtained if circuit breakers isolate the faulty portion of the system without interrupting power flow in other generators, motors, and feeders. Previously, however, it has not been possible to accomplish this objective on direct current systems for the need for maximum speed of circuit breaker operation has prevented the time delays in cascade circuit breakers necessary for selective operation. It has therefore been necessary to sacrifice continuity of service in order to limit the destructive effects of short circuits on equipment in the system.

In accordance with my invention, as applied to a motor or generator for example, the primary and secondary windings of a transformer are included in the armature and shunt field circuits and so poled that the voltage introduced thereby into the shunt field circuit upon occurrence of a sudden short circuit reduces the change in total field magnetomotive force.

Further in accordance with my invention, the characteristics of the transformer are such that under short circuit conditions the armature current is reduced in magnitude sufficiently to avoid damage to the motor or generator but not to extent precluding operation of circuit-breakers or equivalent protective devices provided to disconnect the faulty section of line from the supply source.

Other objects of my invention will be apparent from the following description and claims.

Figure 1A:
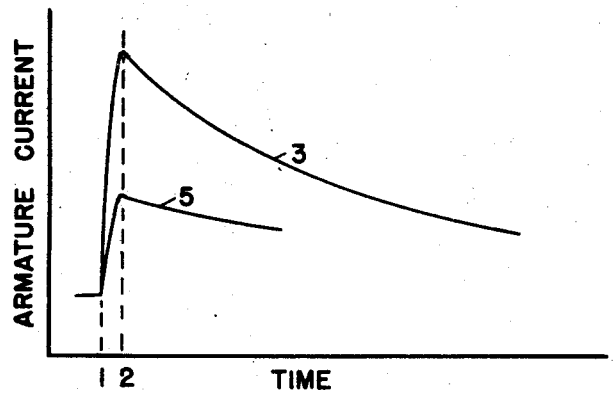
Figure 1 is a curve showing the armature and field currents associated with sudden short circuit of a dynamo-electric machine.
Figure 1B:
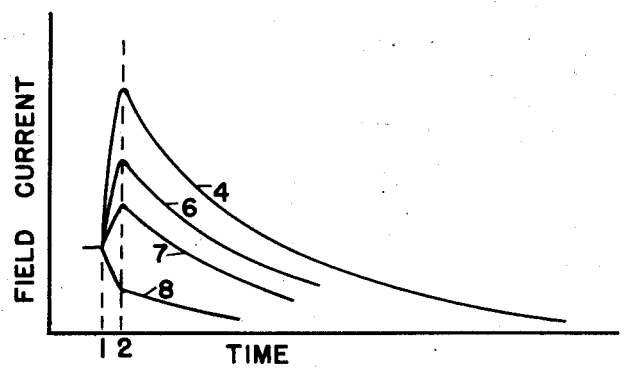

Figure 1a, curve 3, shows the armature current flow in a dynamo-electric machine following sudden short circuit in the electric system to which it is connected. Figure 1b, curve 4, shows the field current flow for the same conditions. Although the figure shows specifically the case of a direct current generator, the same general phenomena occur in other types of direct current dynamo-electric machines such as motors, balancers and the like. The short circuit, providing a sudden decrease in resistance across the machine terminals, causes a rapid increase in armature current between time 1 and time 2, Figure 1. At time 2 the steady current corresponding to the field current is reached and no further increase takes place. Mutual inductance effects cause the field current to rise in a manner corresponding with the armature current increase. From the peak values of armature and field current, decay takes place as shown in Figure 1 until the steady state current values are reached.

The principal destructive effects of the short circuit current are due to the high value reached at time 2, Figure 1, and this value is primarily determined by the total field magnetomotive force acting during the period of current rise. The presence of series field windings does not alter the value of this total magnetomotive force although it influences the proportion contributed by the shunt field.

Figure 2:
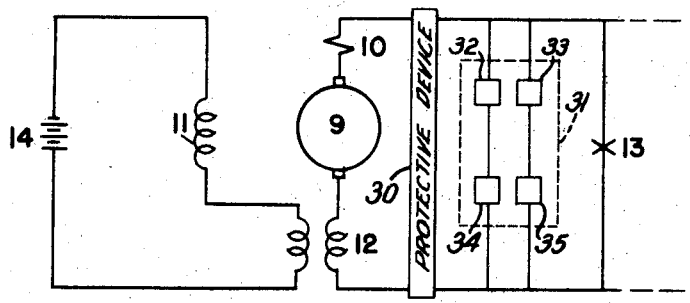
Figure 2 is an elementary diagram showing the basic elements of my invention.

A typical direct current electrical system incorporating the features of my invention is shown in Figure 2. In the figure, 9 represents the armature of the direct current generator, 11 the shunt field winding, 14 the unidirectional voltage source for energizing the shunt field winding, and 10 the series field winding. The utilization network to which the generator supplies current is shown diagrammatically at 31, this network comprising a plurality of utilization or load devices 32 and 33, each connected through a corresponding protective device 34 and 35. A protective device, 30, is provided to disconnect the generator from the utilization network 31.

A transformer, 12, is connected in the circuits of the armature 9 and the shunt field winding 11. It is the function of this transformer to introduce a voltage in the shunt field circuit during the period of rapid current rise following a short circuit condition in the system, thereby aiding or opposing the inherent change in total field magnetomotive force during this interval. The proportions of the transformer are chosen so that the magnitude and direction of this voltage is such that the resultant shunt field magnetomotive force, together with the magnetomotive force of series field winding 10, during sudden short circuit provides a valve of short-circuit current below the value causing damage to the generator but of sufficiently high value eventually to operate device 30 and disconnect the generator. The considerations in determining this size are discussed in further detail hereafter.

The use of a transformer for coupling the armature and field circuits of an arc welding generator for the purpose of controlling transients is known (see Miller, Transients in Arc Welding Generators, A. I. E. E., Trans., vol. 52, page 260) but such transformer is provided for a different purpose and operates in a different manner than the present invention. The purpose of the transformer in arc welding machines is to provide a transient generator short-circuit characteristic identical with the steady state characteristic, thereby preventing arc current transients when unavoidable motion of the operator causes sudden change in arc length. This objective is accomplished by preventing entirely shunt field current variations associated with armature current change. The criterion of performance of these units is the amount of shunt field current change. The amount and polarity of series field is immaterial for arc-welding purposes. In contrast to such teaching and practice, the arrangement for obtaining the result herein desired permits change in shunt field current and the effect of series.

The result of application of the invention to typical shunt, cumulative compound, and differential compound generators is shown in Figure 1. In each case, the short circuit current desired for the initial period following short circuit is that of curve 5, Figure 1a. In the case of a shunt wound generator, the field current required to produce this current is that of curve 7, Figure 1b. A transformer having the size required to produce this current is accordingly applied. In the case of a cumulative compound generator, the short circuit current produces a magnetomotive force in addition to that due to the shunt field winding. The transformer is therefore made of sufficient size to reduce the field current to curve 8, Figure 1b, thereby providing the total magnetomotive force necessary to cause armature current to follow curve 5, Figure 1a. On the other hand, a generator having a differential series field is subject to an increased magnetomotive force in the negative direction when the short-circuit current flows and short-circuit field current flow must be accordingly increased. Hence a transformer of size sufficient only to cause the field current to follow curve 6, Figure 1b, is used.

Figure 3:
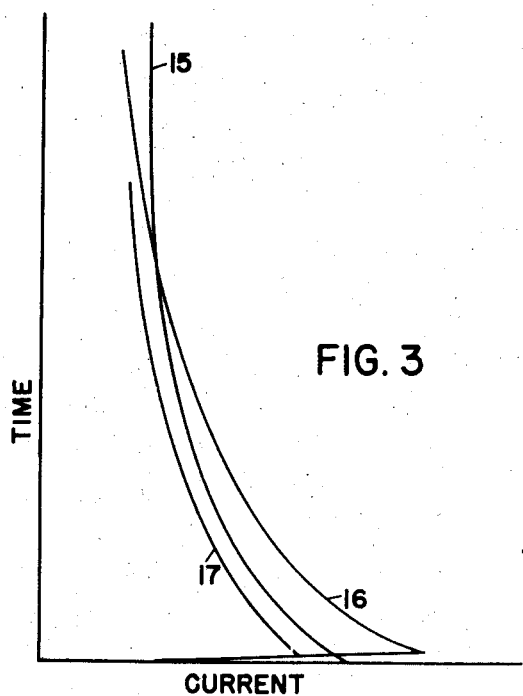
Figure 3 shows the damage curve of a typical electrical device and the time/current curves of short circuits obtained with and without the use of my invention.

Figure 3 illustrates the application of this invention to prevent damage to a motor, generator, or distribution system. Curve 15, Figure 3 is a log-log plot of the damage curve of the apparatus to be protected. So long as the curve of actual current passed by the machine is below and to the left of this curve, no damage will result. This curve is not a constant current value but decays from a very high value for short time to a value only slightly greater than full load current after a long time. There is accordingly no need for limiting the initial short circuit current to low magnitude: in fact it will presently be shown that a high initial current has definite advantages. Curve 16, Figure 3, illustrative of the short circuit curve of a conventional direct current generator, rises rapidly to an exceedingly high value, a value outside damage curve 15, and then decays. Since the current is outside the damage curve, this natural short circuit characteristic will damage the machine or distribution system. A short circuit current curve possible with this invention is shown in curve 17, Figure 3. As indicated by this curve, a short circuit will not result in harm to the equipment because the current is always below the values of the damage curve 15.

Figure 4:
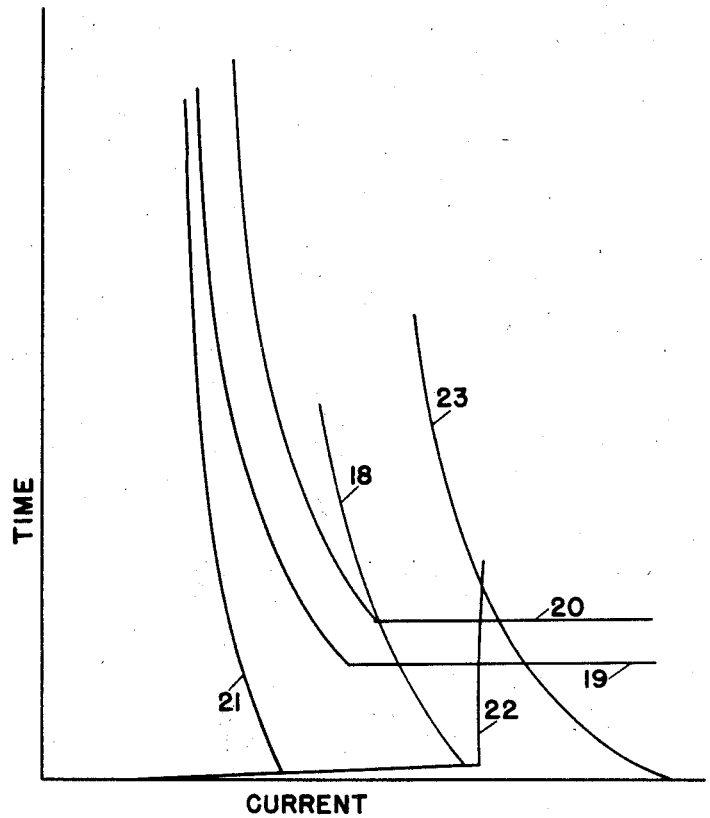
Figure 4 shows the application of this invention to an electric system with fault protective devices.

Figure 4 illustrates the need for a short circuit current of substantial magnitude. Curves 19 and 20, Figure 4, represent the time-current curves of two typical circuit breakers or other protective devices in the system. Curve 19 is lower and to the left of curve 20 in order that the corresponding circuit breaker will trip before that of curve 20 and so provide selective operation necessary to isolate only faulty sections of the system. Curve 21 is the actual current curve of the generator which could be obtained by use of a large transformer. It is evident that the current is so small that neither circuit breaker will trip. Hence the apparatus in the system is protected from damage at the expense of achieving automatic isolation of the faulty portions. With the application of the transformer 12 as contemplated by this invention, a machine short-circuit curve such as curve 18, Figure 4, is obtained. This generator current curve successively crosses the circuit-breaker current curves 19 and 20, thereby giving selective circuit breaker operation.

While the above discussion specifically concerns circuit breakers, the same principles may be applied if fuses or other circuit protective devices are used. In every case, the transformer is used to reduce the short circuit current to a value which avoids damage to equipment but not to the point of precluding operation of fault-protective devices.

The presence of series fields changes the sustained short circuit current of a dynamo-electric machine but, in the absence of a transformer, has little influence on the current during the period of initial rise. This is due to the normal effect of the shunt field current in maintaining field flux approximately constant during this period. The control achieved by the transformer of this invention is effective during this early period so that subsequent rise or decay of current is of minor significance since the protective devices have operated. Hence, though a short circuit characteristic such as curve 22, Figure 4, is obtained for a machine with a large cumulative series field, the circuit breakers (curves 19 and 20, Figure 4) will operate before the current curve crosses the damage curve 23.

The teachings of this invention can be economically practiced only if the proportions of the transformer are arranged in the most economical manner. Otherwise the size of the transformer may offset gains in performance. Fundamentally, the purpose of the transformer is to provide a mutual inductance between the field and armature circuits of the machine. The value of this inductance is:

$$(1) \qquad M = \sqrt{(1-\sigma)L_a L_f}$$

Where:

M is the mutual inductance in henries.
$\sigma$ is the leakage coefficient (see Guillemin, Communication Networks, vol. 1, page 307).
$L_a$ is the self-inductance of the winding in armature circuit.
$L_f$ is the self-inductance of the winding in the shunt field circuit.

The values of $L_a$ and $L_f$ are:

$$(2) \qquad L_a = \frac{N_a \phi_a}{i_a}$$

Where:

$N_a$ is the number turns in the winding in the armature circuit.
$\phi_a$ is the flux inking the winding in the armature circuit at current $i_a$ in that circuit (with no current in the shunt field circuit).
$i_a$ is the armature current rating required.

$$(3) \qquad L_f = \frac{N_f \phi_f}{i_f}$$

Where:

$N_f$ is the number turns in the winding in the field circuit.
$\phi_f$ is the flux linking the winding in the field circuit at current $i_f$ (with no current in the armature circuit).
$i_f$ is the field current rating required.

Substituting Equations 2 and 3 in Equation 1:

$$(4) \qquad M = \sqrt{(1-\sigma) \frac{N_a \phi_a}{i_a} \frac{N_f \phi_f}{i_f}}$$

and:

$$(5) \qquad N_f \phi_f = \frac{M^2 i_a i_f}{(1-\sigma) N_a \phi_a}$$

The total size and weight of the transformer is proportional to the sum of the product of ampere turns and flux of each winding.

$$(6) \qquad S = N_f i_f \phi_f + N_a i_a \phi_a$$

Where S is the size of the transformer.
Substituting Equation 5 in Equation 6:

$$(7) \qquad S = \frac{M^2 i_a i_f^2}{(1-\sigma) N_a \phi_a} + N_a \phi_a i_a$$

The minimum transformer size is obtained when the derivative of Equation 7, with respect to $N_a \phi_a$, is zero:

$$(8) \qquad \frac{dS}{d(N_a \phi_a)} = -\frac{M^2 i_a i_f^2}{(1-\sigma) N_a^2 \phi_a^2} + i_a = 0$$

$$(9) \qquad N_a \phi_a = \frac{M i_f}{\sqrt{1-\sigma}}$$

Substituting in Equation 7, the minimum size becomes:

$$(8) \qquad S = \frac{2 M i_a i_f}{\sqrt{1-\sigma}}$$

Substituting Equation 9 into Equation 4, it can be shown that the most economical transformer construction results when:

$$(9) \qquad N_a \phi_a i_a = N_f \phi_f i_f$$

That is, the product of flux linkages times the rated current for the armature circuit winding equals the product of flux linkages times rated current for the field circuit winding. These products will be referred to as the flux linkage-rated current products for the respective windings.

The above derivation of Equation 9 does not take into account the effect of magnetic saturation. This effect, particularly at high short circuit currents, may be considerable. It will not, however, change to a great extent the most economical transformer design proportions.

This invention is capable of wide variation from the forms illustrated and described, its scope being defined in the appended claims.

The invention described herein may be manufactured and used by or for the Government of the United States of America for governmental purposes without the payment of any royalties thereon or therefor.

What I claim is:

1. An electrical system comprising in combination, a generator of unidirectional electromotive force having a field winding, a circuit protective device, and a utilization network in series connection, said utilization network including circuit protective devices, said first protective device being of the type wherein circuit disconnection operation takes place when the current flow exceeds a predetermined value for a predetermined time, said time decreasing as the current value increases, means to supply energizing current to said field winding, and a transformer having a plurality of windings, one of said windings connected in the circuit of said generator, said first protective device, and said utilization device and another of said windings connected in the circuit of said means, the windings of said transformer being so proportioned and poled that said first circuit protective device operates upon sudden short circuit of said generator but only after a predetermined time, whereby the circuit protective devices in said utilization network are enabled to operate before said first circuit protective device and disconnect the short circuit if it occurs beyond one of said last circuit protective devices.

2. An electrical system comprising in combination, a generator of unidirectional electromotive force having a field winding, a circuit protective device, and a utilization network in series connection, said utilization network including circuit protective devices, said first protective device being of the type wherein circuit disconnection operation takes place when the current flow exceeds a predetermined value for a predetermined time, said time decreasing as the current value increases, means to supply energizing current to said field winding, and a transformer having a plurality of windings, one of said windings connected in the circuit of said generator, said first protective device, and said utilization device and another of said windings connected in the circuit of said means, the windings of said transformer being so proportioned and poled that said first circuit protective device operates upon sudden short circuit of said generator but only after a predetermined time, whereby the circuit protective devices in said utilization network are enabled to operate before said first circuit protective device and disconnect the short circuit if it occurs beyond one of said last circuit protective devices, said transformer being further proportioned so that the product of flux linkages times rated current in one winding equals the product of flux linkages times rated current in the other winding.

GEORGE E. FROST.

REFERENCES CITED

The following references are of record in the file of this patent:

UNITED STATES PATENTS

| Number | Name | Date |
|---|---|---|
| 782,340 | Hubbard | Feb. 14, 1905 |
| 1,922,760 | Dreese | Aug. 15, 1933 |